(12) United States Patent
Tomkins et al.

(10) Patent No.: US 10,915,580 B2
(45) Date of Patent: Feb. 9, 2021

(54) PROVIDING QUERY SUGGESTIONS AND/OR SEARCH RESULTS BASED ON DETERMINED USER ACTIVITY

(71) Applicant: Google Inc., Mountain View, CA (US)

(72) Inventors: Andrew Tomkins, Menlo Park, CA (US); Amr Ahmed, Mountain View, CA (US); Alexander Johannes Smola, Sunnyvale, CA (US); Daniel Wyatt, San Francisco, CA (US); Daniel J. Clancy, Los Altos, CA (US); Martin Zinkevich, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 842 days.

(21) Appl. No.: 15/394,582

(22) Filed: Dec. 29, 2016

(65) Prior Publication Data
US 2017/0228471 A1  Aug. 10, 2017

Related U.S. Application Data

(63) Continuation of application No. 14/098,928, filed on Dec. 6, 2013, now abandoned.
(Continued)

(51) Int. Cl.
*G06F 16/9032* (2019.01)
*G06Q 30/02* (2012.01)
(Continued)

(52) U.S. Cl.
CPC ...... *G06F 16/90328* (2019.01); *G06F 3/0482* (2013.01); *G06F 16/248* (2019.01);
(Continued)

(58) Field of Classification Search
CPC .......... G06F 16/90328; G06F 16/2428; G06F 16/24578; G06F 16/248; G06F 3/0482; G06Q 30/0256; G06Q 30/0261
See application file for complete search history.

(56) References Cited

U.S. PATENT DOCUMENTS

| | | |
|---|---|---|
| 5,603,054 A | 2/1997 | Theimer et al. |
| 6,842,877 B2 | 1/2005 | Robarts et al. |
| | (Continued) | |

OTHER PUBLICATIONS

Reardon, Marguerite: "Motion sensing comes to mobiel phones" available at https://www.cnet.com/news/motion-sensing-comes-to-mobile-phones/ (Year: 2007).*

(Continued)

*Primary Examiner* — Katherine Kolosowski-Gager
(74) *Attorney, Agent, or Firm* — Middleton Reutlinger

(57) ABSTRACT

Methods and apparatus related to determining an activity of a user based on sensor readings from sensor(s), and providing, for presentation to the user via a user interface output of a computing device of the user, information that is based on the determined activity. In some implementations, the information may be provided in response to input entered by the user via a user interface input device of the computing device of the user. In some implementations, the input may be a search query and the information may be search results. In some implementations, the input may be a partial query and the information may be query suggestions.

14 Claims, 7 Drawing Sheets

Related U.S. Application Data

(60) Provisional application No. 61/840,374, filed on Jun. 27, 2013.

(51) Int. Cl.
  *G06F 16/248* (2019.01)
  *G06F 16/242* (2019.01)
  *G06F 16/2457* (2019.01)
  *G06F 3/0482* (2013.01)

(52) U.S. Cl.
  CPC .... *G06F 16/2428* (2019.01); *G06F 16/24578* (2019.01); *G06Q 30/0256* (2013.01); *G06Q 30/0261* (2013.01)

(56) References Cited

U.S. PATENT DOCUMENTS

| | | |
|---|---|---|
| 7,496,500 B2 | 2/2009 | Reed et al. |
| 7,984,006 B2 | 7/2011 | Price |
| 8,055,707 B2 | 11/2011 | Desai et al. |
| 8,108,206 B2 | 1/2012 | Hufnagel et al. |
| 8,364,467 B1 | 1/2013 | Bowman et al. |
| 8,375,099 B2 | 2/2013 | Carroll et al. |
| 8,417,650 B2 | 4/2013 | Graepel et al. |
| 8,521,818 B2 | 8/2013 | McGann et al. |
| 8,560,487 B2 | 10/2013 | Jhoney et al. |
| 8,599,801 B2 | 12/2013 | Baio et al. |
| 8,606,497 B2 | 12/2013 | Doherty et al. |
| 8,731,821 B2 | 5/2014 | Sheynblat |
| 2007/0219706 A1* | 9/2007 | Sheynblat .......... G01C 21/3679 701/532 |
| 2009/0307212 A1 | 12/2009 | Ramot et al. |
| 2010/0131902 A1* | 5/2010 | Teran ................. G06F 16/9535 715/843 |
| 2011/0040756 A1* | 2/2011 | Jones .................... G06F 16/951 707/737 |
| 2011/0246268 A1 | 10/2011 | Satyavolu et al. |
| 2011/0251990 A1 | 10/2011 | Yarvis et al. |
| 2012/0100867 A1* | 4/2012 | Liang ................. G06Q 30/0261 455/456.1 |
| 2012/0150532 A1 | 6/2012 | Mirowski et al. |
| 2012/0239761 A1 | 9/2012 | Linner et al. |
| 2012/0317499 A1 | 12/2012 | Shen |
| 2012/0331036 A1 | 12/2012 | Duan et al. |
| 2013/0073662 A1 | 3/2013 | Meunier et al. |
| 2013/0159270 A1 | 6/2013 | Urmy et al. |
| 2013/0297551 A1 | 11/2013 | Smith et al. |

OTHER PUBLICATIONS

Yang Song, et al "Post-ranking query suggestion by diversifying search results." In Proceedings of the 34th international ACM SIGIR conference on Research and development in Information Retrieval (SIGIR '11). ACM, New York, NY, USA, 815-824. DOI: https://doi.org/10.1145/2009916.2010025 (Year: 2011).*

Corston-Oliver, Simon et al, "Task-Focused Summarization of Email," Microsoft Research Jul. 2004, (http://www1.cs.columbia.edu/~lokesh/pdfs/Corston.pdf), 8 pages.

Laclavik, et al., "Email Analysis and Information Extraction for Enterprise Benefit," Institute of Informatics, Slovak Academy of Sciences, Slovakia, Computing and Informatics, vol. 30, 2011, pp. 57-87.

International Search Report and Written Opinion of PCT Serial No. PCT/US14/44147, dated Jul. 8, 2015.

Reardon, Marguerite, "Motion sensing comes to mobile phones," available at http://www.cnet.com/news/motion-sensing-comes-to-mobile-phones. Published Jun. 11, 2007, last accessed Feb. 22, 2016.

* cited by examiner

Based on your recent hiking, you may be interested in shopping at:

Sports Store
1234 Anonymous Lane
Example City, State – 41103
Distance from your current location 0.5 mi.

8 reviews available

Rating: ****

FIG. 6

There are several movies playing nearby:

Movie Theater
567 Main Street
Example City, State – 41103
Distance from your current location: 0.3 miles.

---

Movie 1: Rated R;  Showtimes: 1:30, 4:00, 7:30

Movie 2: Rated PG; Showtimes: 12:10, 2:05, 5:15

Movie 3: Rated R; Showtimes: 11:50, 1:55, 5:30, 9:15

FIG. 7

PROVIDING QUERY SUGGESTIONS AND/OR SEARCH RESULTS BASED ON DETERMINED USER ACTIVITY

BACKGROUND

Information is often provided to a user based on a ranking of the information and/or a geographic location of the user. For example, suggestions to visit locations are often provided based on a ranking of the locations and/or geographic location of the locations. For example, a particular restaurant that is geographically close to a user may be recommended to a user as a potential restaurant that the user may enjoy.

SUMMARY

The present disclosure is directed to methods and apparatus for identifying a plurality of user locations over a time period, determining a user activity based on the user locations, and providing information based on the determined user activity. In some implementations, the provided information may be a user activity suggestion. In some implementations, the provided information may be search results that are responsive to a search query. In some implementations, the provided information may be query suggestions that are responsive to a query of the user.

In some implementations, a method is provided that includes the steps of: identifying, utilizing one or more processors, a plurality of user locations over a time period; determining, utilizing one or more of the processors, a user activity based on the user locations; determining, utilizing one or more of the processors, a user activity suggestion based on the determined user activity; and providing, utilizing one or more of the processors, the user activity suggestion as a recommendation to the user.

This method and other implementations of technology disclosed herein may each optionally include one or more of the following features.

The user activity may be based on the time period. The user activity may be based on distance traveled between two or more of the user locations over the time period.

The user activity may include a mode of transportation and the user activity suggestion may be conducive to the mode of transportation. The mode of transportation may be public transportation and the step of determining the user activity suggestion based on the determined user activity may include determining that the user activity suggestion is within a threshold distance of one or more public transportation routes. The mode of transportation may be walking and the step of determining the user activity suggestion based on the determined user activity may include determining that the user activity suggestion is within a threshold walking distance of one or more of the user locations.

The method may further include the step of: determining a time spent at a given location of the user locations, and determining the user activity suggestion based on the determined user activity may include determining the user activity based on the time spent at the given location. The method may further include the steps of: determining the user activity suggestion is a first user activity suggestion when the time spent at the given location satisfies a threshold; and determining the user activity suggestion is a second user activity suggestion when the time spent at the given location fails to satisfy the threshold. The given location may be a restaurant, the second user activity suggestion may be dining at another restaurant and the first user activity suggestion may be unrelated to having a full meal at a restaurant.

The method may further include the step of determining a route to reach an activity location that is associated with the user activity suggestion and the route to the activity location may be within a threshold detour distance of the one or more user locations.

In some implementations, a method is provided that includes the steps of: identifying, utilizing one or more processors, a plurality of user locations over a time period; determining, utilizing one or more of the processors, a user activity based on the user locations; receiving, utilizing one or more of the processors, a user input; providing, utilizing one or more of the processors, one or more results for the user input based on the determined user activity.

The user input may be a search query. The one or more results may be search results responsive to the search query. The search results may be ranked based on the determined user activity. The method may further include the step of modifying the search query based on the user activity when the search results are responsive to the modified search query. The one or more results may be query suggestions for the search query. The query suggestions may be ranked based on the determined user activity. The method may further include the step of generating one or more of the query suggestions based on the determined user activity.

Other implementations may include a non-transitory computer readable storage medium storing instructions executable by a processor to perform a method such as one or more of the methods described herein. Yet another implementation may include a system including memory and one or more processors operable to execute instructions, stored in the memory, to perform a method such as one or more of the methods described herein.

Particular implementations of the subject matter herein provide information based on a determined activity of a user. A user activity may be one or more actions in which the user is engaged that may be determined based on identifying one or more user locations over a time period. The provided information may be, for example, a user activity suggestion, search results, and/or a query suggestion.

It should be appreciated that all combinations of the foregoing concepts and additional concepts discussed in greater detail herein are contemplated as being part of the inventive subject matter disclosed herein. For example, all combinations of claimed subject matter appearing at the end of this disclosure are contemplated as being part of the inventive subject matter disclosed herein.

BRIEF DESCRIPTION OF THE DRAWINGS

FIG. 6 illustrates an example suggestion provided to a user.

FIG. 7 illustrates another example suggestion provided to a user.

DETAILED DESCRIPTION

A user may be performing one or more activities, and may be present at multiple locations over a time period while performing the one or more activities. User activities may include a mode of transportation, such as riding a bicycle, walking, hiking, riding in a car, and/or travelling by public transportation, for example. In some implementations, a user activity may be an intended purpose for the user to travel between locations, such as shopping, going home, going to work, and/or going on a business trip, for example.

A user may be provided information based on a determined activity of the user. For example, the provided information may be a user activity suggestion to perform a second activity while the user is performing a determined activity. Also, for example, a user may be provided with a user activity suggestion to perform based on a previously determined user activity. Also, for example, the provided information may be results that are responsive to input of a user and that are related to the determined activity of the user, such as search results and/or query suggestions.

Figure 4:
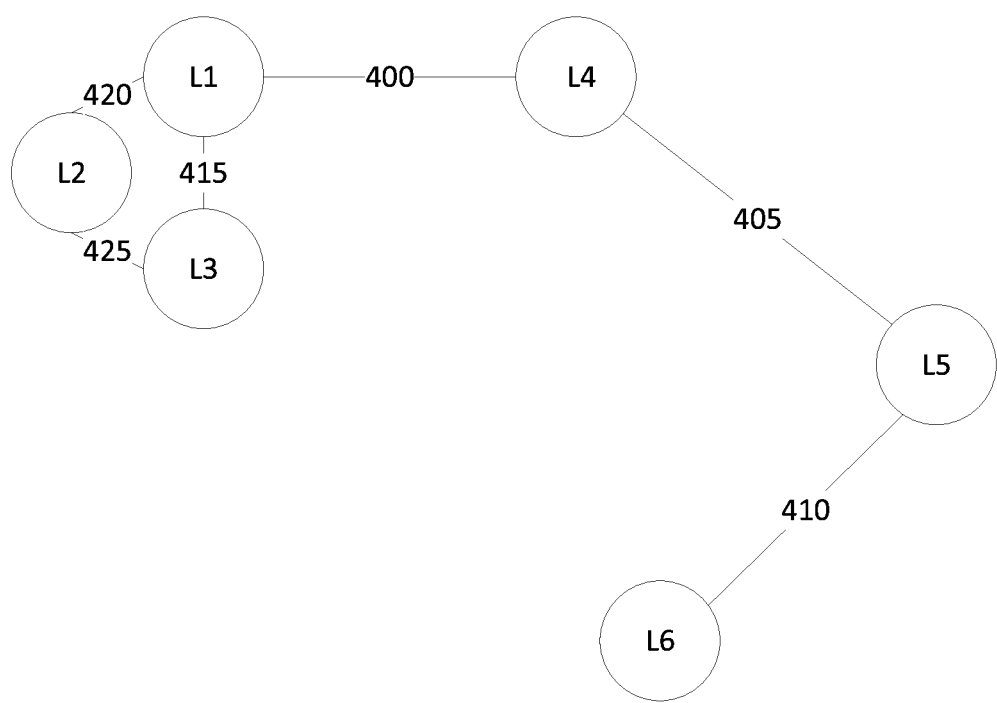
FIG. 4 is an example map of multiple locations and paths between the locations.

Referring to FIG. 4, an example map of multiple locations and paths between the locations is provided. The locations and paths of FIG. 4 will be used throughout this specification to illustrate examples. In some examples, the locations L1, L2, L3, L4, L5, and L6 may be locations where the presence of a user is identified utilizing one or more methods and/or apparatus described herein. In some examples, one or more of the locations L1 through L6 may be locations where a user activity suggestion may be performed. In some examples, one or more of paths 400, 405, 410, 415, 420, and 425 may be paths where a user is performing one or more user activities and the path and/or the one or more user activities may be determined utilizing one or more methods and/or techniques described herein. In some examples, one or more of paths 400, 405, 410, 415, 420, and 425 may be paths that a user may traverse to arrive at a location where an activity suggestion may be performed.

Figure 1:
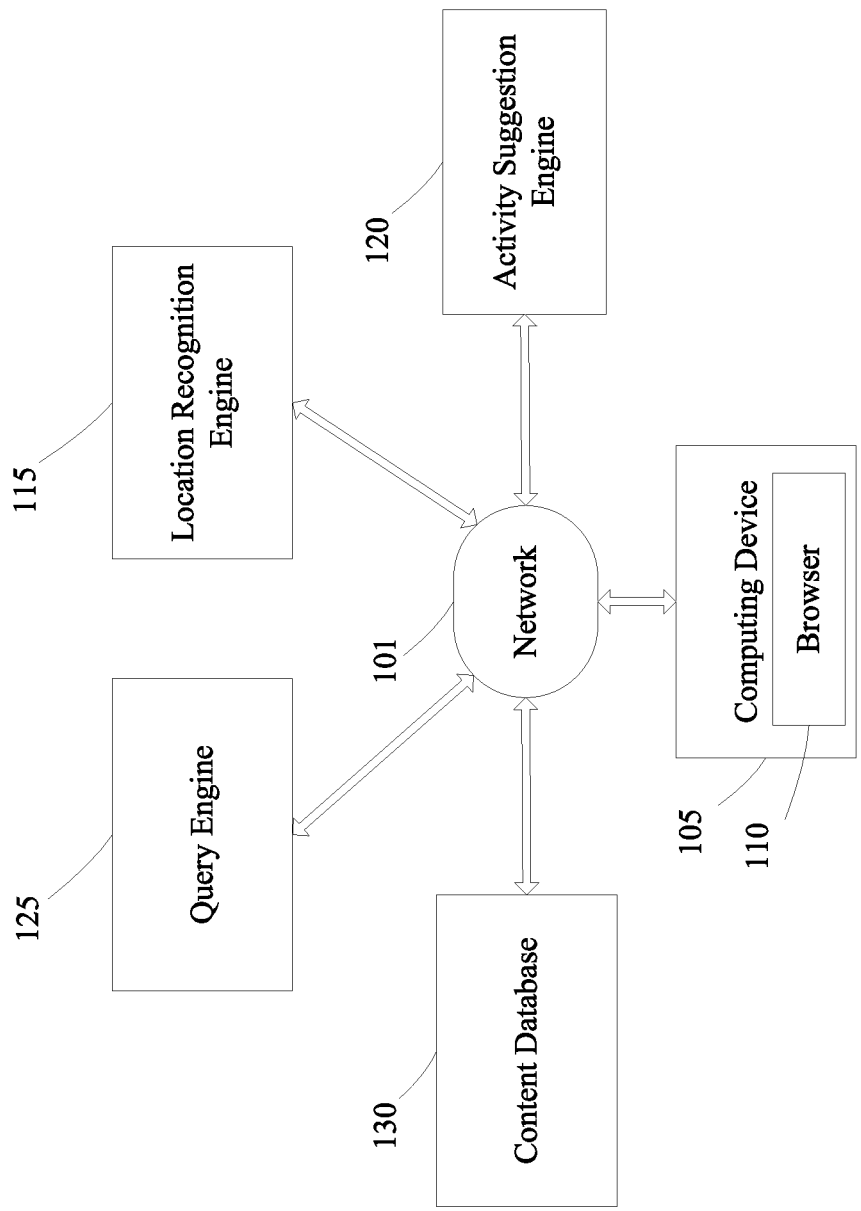
FIG. 1 is a block diagram of an example environment in which information may be provided to a user based on a user activity determined based on a plurality of user locations.

Referring to FIG. 1, a block diagram is provided of an example environment in which information may be provided to a user based on a user activity determined based on a plurality of user locations. The environment includes a computing device 105 with browser 110, a location recognition engine 115, an activity suggestion engine 120, a query engine 125, and a content database 130. In this specification, the term "database" will be used broadly to refer to any collection of data. The data of the database does not need to be structured in any particular way, or structured at all, and it can be stored on storage devices in one or more locations. Thus, for example, the content database 130 may include multiple collections of data, each of which may be organized and accessed differently. The environment also includes a communication network 101 that enables communication between various components of the environment. The communication network 101 facilitates communication between the various components in the environment. In some implementations, the communication network 101 may include the Internet, one or more intranets, and/or one or more bus subsystems. The communication network 101 may optionally utilize one or more standard communications technologies, protocols, and/or inter-process communication techniques.

The computing device 105 executes one or more applications and may include hardware and/or software to enable identification of the geographic location of the computing device 105. The computing device 105 may be, for example, a desktop computer, a laptop computer, a cellular phone, a smartphone, a personal digital assistant (PDA), a wearable computing device (e.g., digital watch, earpiece, glasses), a tablet computer, a navigation system, and/or another computing device. The computing device 105 includes memory for storage of data and software applications, a processor for accessing data and executing applications, and components that facilitate communication over the communication network 101. In some implementations, the computing device 105 may include a web browser 110. The operations performed by the computing device 105 may be distributed across multiple computer systems.

As discussed herein, in some implementations, location recognition engine 115, activity suggestion engine 120, and/or query engine 125 may identify one or more properties associated with one or more entities from an entity database, such as content database 130. In some implementations, entities are topics of discourse. In some implementations, entities are persons, places, concepts, and/or things that can be referred to by a text fragment (e.g., a term or phrase) and are distinguishable from one another (e.g., based on context). For example, the text "bush" may potentially refer to multiple entities such as President George Herbert Walker Bush, President George Walker Bush, a shrub, and the rock band Bush. Also, for example, the text "sting" may refer to the musician Gordon Matthew Thomas Sumner or the wrestler Steve Borden.

In some implementations, an entity may be referenced by a unique entity identifier that may be used to identify the entity. The unique entity identifier may be associated with one or more properties associated with the entity. For example, in some implementations, the content database 130 may include properties associated with unique identifiers of one or more entities. For example, a unique identifier for the entity associated with the wrestler Steve Borden may be associated with a name or alias property of "Sting", another alias property of "Steve Borden", and/or an occupation property of "wrestler" in the content database 130. Additional and/or alternative properties may be associated with an entity in one or more databases such as content database 130.

In some implementations, a plurality of locations for a user may be identified to determine a user activity. In some implementations, the location recognition engine 115 may identify the plurality of locations of the user. The location recognition engine 115 may identify a location where a user is present utilizing, for example, GPS, Wi-Fi signals, cellular phone triangulation, RFID, and/or user check-ins at locations. The term "check-in", as used herein, includes a user-approved and/or user-initiated indication of a visit to a location. For example, a user at a Location A may be provided, via a mobile computing device, with an option to verify that the user is at Location A. For example, the option to verify may be in the form of a prompt provided to the user, such as, for example, "Would you like to check-in to your current location?" along with a list of selectable options including "Location A", "Location B", and "Location C". The user may select "Location A" in response to the prompt to check-in to Location A. Also, for example, a user may choose to automatically check-in to one or more locations visited by the user. For example, locational data may indicate that the user is at Location A, and the user, via a mobile computing device, may automatically check-in to Location A. Additional and/or alternative techniques to check-in to a geographical location may be utilized.

In some implementations, user locations may be detected via one or more hardware components of the computing device 105. For example, location recognition engine 115 may identify the location of a user by receiving signals that are indicative of the position of the user and/or the position of the computing device 105. In some implementations, location recognition engine 115 may be included with one or more applications that are executing on computing device 105. For example, location recognition engine 115 may be combined with hardware and/or software on computing device 105 to identify the location of the computing device 105 based on a signal that indicates the location of the computing device 105, such as one or more signals as described herein. In some implementations, location recognition engine 115 may receive location information from hardware and/or software that is executing on computing device 105 via communication network 101.

In some implementations, user locations may be identified by the location recognition engine 115 on a periodic basis, such as every 30 seconds. In some implementations, user locations may be identified by the location recognition engine 115 asynchronously, such as when the user is detected as changing location by more than 100 feet. In some implementations, location engine 115 may identify a user location based on data that is provided to the location recognition engine 115 when the user is stationary for a time period and/or has arrived at a waypoint while moving. For example, location recognition engine 115 may identify a user location when the user has stopped for more than five minutes before changing locations. In some implementations, a user location may be identified based on active notifications from a user, such as a user checking into a location when the user has arrived and/or left a location.

In some implementations, a user location may identified based on triangulation and/or other techniques utilizing one or more RF signals. For example, computing device 105 may be identified by multiple cellular phone towers and the user location may be approximated based on triangulation of the cellular signals. Also, for example, computing device 105 may determine a user location based on a broadcast signal from the location that includes information about the location, such as an RFID signal with encoded location information. For example, the encoded location information may include an encoded name, address and/or global position of the location, which may be provided to location recognition engine 115.

In some implementations, the type of location where a user is located may be determined by location recognition engine 115. In some implementations, the type of location may be a type of physical location, such as a restaurant, a gym, a bus stop, a park, a school, a theater, a department store, or a laundry service. In some implementations, the type of location may be determined via one or more databases such as content database 130. For example, in some implementations, a location database may include a listing of entities associated with a physical location. In some implementations, the location recognition engine 115 may identify an entity that is mapped to a physical location identified by the user location. A user location may include, for example, one or more of a textual address, a latitude longitude pair, and an address identifier. Also, for example, the location recognition engine 115 may identify an Italian restaurant in downtown Chicago and identify its physical address via content database 130. In some implementations, location recognition engine 115 may determine the activity of the user based on an action that may be performed at the user location. For example, a user at a department store may be determined to be shopping; a user at a restaurant may be determined to be eating; etc.

In some implementations, a user activity may be determined for a user based on an amount of time spent at a location. For example, a user may be identified as spending an hour at a location that has been identified as a shopping location, and the user may be subsequently identified as being at a second location that is a shopping location for an amount of time that is indicative of shopping. Location recognition engine 115 may determine that the user is shopping based on the identified locations of the user that are shopping locations for a time period at each location that is indicative of shopping. Also, for example, a user may be identified at multiple retail locations less than a threshold amount of time that is indicative of shopping, such as a user being identified at multiple shopping locations that are in close proximity of a path of the user for a time that is less than an amount of time that is indicative of shopping. In those instances, the location recognition engine 115 may determine that the user is travelling through and not shopping in an area where a number of stores are in close proximity to the path of the user.

In some implementations, the activity that is determined for the user may be the mode of transportation of the user. Modes of transportation may include walking, hiking, bicycling, car travel, bus travel, and air travel, for example. In some implementations, the mode of transportation may be determined based on the speed at which a user is moving. The speed of a user may be determined based on the time it takes for a user to travel between two points or more that are separated by an identifiable distance. For example, referring to FIG. 4, the location recognition engine 115 may identify that the user has traveled between L5 and L6, that path 410 is one mile, and that the user took 60 seconds to travel between the two locations. The location recognition engine 115 may determine that the user is traveling approximately 60 miles per hour and that the user is traveling by car and/or bus between the locations based on the determined speed of the user between the locations (i.e., 60 miles per hour). Also, for example, location recognition engine 115 may identify that the user was located at L5 and L6 ten minutes apart and determine that the user is traveling at six miles per hour. Location recognition engine 115 may determine that the user is walking, jogging, or riding a bicycle between the points based on the determined speed of the user.

In some implementations, location recognition engine 115 may determine a mode of transportation based on multiple determined speeds of the user along a path. Location recognition engine 115 may determine the mode of transportation of the user more accurately as more speed determinations are considered. For example, referring to FIG. 4, location recognition engine 115 may determine that the user is traveling 60 miles per hour between L6 and L5, 5 miles per hour between L5 and L4, and 55 miles per hour between L4 and L1. In some implementations, location recognition engine 115 may take into account an average speed of a user along a path that includes multiple locations to determine the mode of transportation of the user. For example, location recognition engine 115 may determine that the user is traveling by car or bus between L6 and L1 based on the average speed of the user on the path of 410 to 405 to 400, and not based on the individual determined speeds between locations along the path in order to take into account possible variations of speed of a mode of transportation due to, for example, traffic congestion, traffic lights, and/or varying speed limits. Alternatively or additionally, location recognition engine 115 may take into account the variations of speeds between locations to determine the mode of transportation of the user. For example, location recognition engine 115 may identify L5 and L4 as bus stop locations that are near each other and determine that the user is travelling by bus based on a speed indicative of travelling by bus from L6 to L5, a speed indicative of walking between the bus stops at L5 and L4, and boarding and travelling by a second bus from L4 to L1.

In some implementations, the type of locations where a user is identified may be utilized to determine the likely transportation mode of the user. For example, location recognition engine 115 may identify that the user may be traveling by car or bus based on the calculated speed of the user between two points. Additionally, location recognition engine 115 may identify that multiple locations on the path on which the user is traveling are associated with locations on a bus route. Based on an identified path of the user that follows a series of bus stops, location recognition engine 115 may determine that the user is more likely traveling by bus rather than car. Also, for example, location recognition engine 115 may identify a plurality of locations for the user that are indicative of the bus route, and determine that the user is not traveling by bus if one or more subsequent locations of the user is not located on a bus route. Also, for example, location recognition engine 115 may determine that the user is walking and/or riding a bicycle if the locations where the user is identified are not identified as a traffic road and/or if the locations are on a pedestrian-only path. Also, for example, a user may be determined to be traveling by train if the locations are on a train-only path. Also, for example, a user may be identified at a bus stop for a time period that is indicative of waiting for a bus followed by a period of traveling 30 miles per hour, and location recognition engine 115 may determine that the user is traveling by bus. Also, for example, location recognition engine 115 may determine that the user is traveling by bus based on the presence of the user at one or more bus stops at times that a known bus route timetable indicates that a bus should be located at those bus stops.

In some implementations, one or more sensors may be utilized to determine the user activity but do not necessarily identify a particular user location. The sensors may be utilized in combination with one or more user locations to determine the user activity or may be independently utilized to determine user activity. For example, an accelerometer may be utilized to determine the transportation mode of the user. An accelerometer may be included in the hardware components of a computing device, such as computing device 105. An accelerometer may be utilized to determine subtle movements of the user. The force and/or frequency of movements of the user determined via the accelerometer may be utilized to determine, for example, whether a user is walking, running, or riding a bicycle. An accelerometer may detect lighter body movements with less frequency when a user is walking than when the user is jogging based on the body movements of the user (i.e., faster movements when jogging). Also, for example, an accelerometer may detect smoother movements of a user when the user is bicycling, riding a bus, and/or driving a car.

In some implementations, location recognition engine 115 may determine multiple user activities in which a user may be engaged. For example, location recognition engine 115 may determine that the user is traveling 60 miles per hour between L6 and L5, 5 miles per hour between L5 and L4, and 55 miles per hour between L4 and L1. Location recognition engine 115 may determine that the user may be potentially travelling by car based on the average and/or overall speed of the user on the route from L6 to L1. Additionally, location recognition engine 115 may identify L5 and L4 as bus stop locations that are near each other and determine that the user may be potentially travelling by bus based on the user movements and speeds that are indicative of travelling by bus as described herein. In some implementations, location recognition engine 115 may identify a more likely user activity based on additional information. For example, location recognition engine 115 may identify additional locations of the user to determine if the user is travelling between locations on a bus route. Also, for example, location recognition engine 115 may determine that the user is more likely to be travelling by bus based on identified preferences of the user that indicate that the user often travels by public transportation. Also, for example, location recognition engine 115 may determine that the user is more likely to be traveling by bus based on known bus route timetables and the time that the user is located at locations that are bus stops.

In some implementations, multiple activities may be performed by the user simultaneously, and the multiple user activities may be determined by the location recognition engine 115. For example, location recognition engine 115 may determine that the user is shopping based on identifying L1 and L2 as shopping locations where the user was located for a threshold amount of time that is indicative of shopping. Additionally, location recognition engine 115 may determine that the user is walking based on the determined speed of the user on path 420. In some implementations, activity suggestion engine 120 may provide the user with a user activity suggestion that is related to multiple activities, such as walking to a different shopping location that is within a threshold walking distance to the user location. For example, location recognition engine 115 may determine that the user is shopping and located at L1, and activity suggestion engine 120 may provide the user with the user activity suggestion of shopping at L3 based on identifying L3 as a shopping location and determining that path 415 is less than a threshold walking distance from L1.

In some implementations, multiple user activities that may not be performed simultaneously may be determined and location recognition engine 115 may determine a confidence level for each user activity that indicates the likelihood that the associated user activity is the activity that the user is performing. For example, the user may be determined to be shopping and/or eating at a restaurant based on the user spending a threshold time at a portion of a mall that includes both shopping areas and dining areas, and the location recognition engine 115 may determine that the user is more likely to be shopping than eating based on one or more factors, such as the time spent at the location, attributes that are associated with the user, trends of other users that have visited the location, and/or the time of day. Confidence levels may be utilized by one or more components to provide information to the user. For example, confidence levels may be utilized by the query engine 125 to rank search results and/or query suggestions. Also, for example, activity suggestion engine 120 may provide an activity suggestion to a user based the user activity with the highest confidence level when multiple potential activities have been identified for the user.

Information may be provided to a user based on one or more determined activities of the user. In some implementations, the information may be an activity suggestion and activity suggestion engine 120 may provide the activity suggestion to a user via one or more applications that are executing on computing device 105, such as browser 110. In some implementations, the information may be one or more search results that are responsive to input from the user. In some implementations, the information may be one or more query suggestions based on a partial query that is entered by the user. Search results and/or query suggestions may be provided to the user by query engine 125 via an application executing on computing device 105, such as browser 110. In some implementations, a user may be provided with one or more of an activity suggestion, a query suggestion, and/or search results. For example, web browser 110 may be utilized to provide the user with search results based on a determined activity and an application on computing device 105 may provide the user with an activity suggestion based on the same determined activity.

An activity suggestion may be identified based on the determined activity of the user. The activity suggestion may be provided to the user on one or more computing devices that share characteristics with computing device 105. For example, the user may be notified of an activity suggestion on computing device 105 via communication network 101. In some implementations, the computing device 105 that is initially utilized to determine the user activity may be different than the computing device 105 that is utilized to provide a notification. For example, a user activity may be identified based on GPS signals that are received by a cellular phone and a user activity suggestion may be provided to the user on a desktop computer.

In some implementations, a user activity suggestion may be provided that may be performed while the user is performing the determined user activity. For example, the user may be determined to be riding a bus, and the user may be provided with a user activity suggestion to transfer to a different bus based on the determined activity of riding a bus and the identified presence of the user near a location that is determined to be a bus transfer location on the bus route. Also, for example, a user may be determined to be shopping and may be provided with an activity suggestion of visiting a particular store where the user has indicated an interest in visiting and/or that is near the location of the user. Also, for example, the user may be identified as traveling by car and the user may be provided with a location to purchase gas based on the user activity of traveling by car.

In some implementations, activity suggestion engine 120 may identify multiple user activity suggestions for a user for a determined user activity and determine the activity suggestion to provide to the user only when the activity suggestion engine 120 is provided additional information. For example, location recognition engine 115 may determine that a user is at a restaurant location. Activity suggestion engine 120 may identify a user activity suggestion of going to a different restaurant for dinner if the user is determined to be at the restaurant less than a threshold time that is indicative of having a full meal at the restaurant (e.g., the user may have had only appetizers and/or drinks, the user may not have been able to get a table). Also, for example, activity suggestion engine 120 may identify a user activity suggestion of going to a movie only when the time that the user spent at the restaurant location is indicative of the user having a full meal.

In some implementations, a user activity suggestion may be provided to the user based on whether a threshold distance between a location of the user and a location where the provided activity suggestion may be performed satisfies a threshold distance. The threshold distance between the location where a user activity suggestion may be performed and the location of the user may be based on the type of activity that the user is performing. For example, the user may be determined to be travelling by car and the threshold distance for a user activity suggestion when traveling by car may be, for example, 5 miles. In such situations, the user may be provided with a location where a product may be purchased that the user has previously indicated an interest in purchasing that is within 1 mile from the current location of the user. Also, for example, the user may be determined to be walking and the threshold distance for a user activity suggestion when walking may be, for example, 0.5 miles. In such situations, the user may not be provided with a location where a product may be purchased when the location is 1 mile from the user location. Also, for example, referring to FIG. 4, a user may be determined to be shopping at L1 and both L2 and L4 may be shopping locations, where L2 is within a threshold walking distance from L1 and L4 is not within a threshold walking distance from L1 but within a threshold driving distance of L1. An activity suggestion of shopping at L2 may be provided to the user if the user is determined to be walking or travelling by car, and L4 may be provided as a shopping location only when the user is determined to be travelling by car.

In some implementations, threshold distances may be set for a mode of transportation. For example, the threshold distance for walking may be set as 0.5 miles for all circumstances. In some implementations, a user may set threshold distances for modes of transportation. For example, a user may set the threshold distance between a user location and a location where a user activity suggestion may be performed as 1 mile when the user is determined to be walking and 5 miles when the user is determined to be driving. In some implementations, a threshold distance may be based on the general area where a user is determined as being located. In some implementations, a threshold distance may be determined based on information that is known about the determined location of the user and the location where a user activity suggestion may be performed. For example, a user location and a user activity suggestion location may be determined to be located in a rural area and the threshold distance for a user that is determined to be walking may be adjusted, such as setting the threshold distance to 0.2 miles. Also, for example, a threshold distance may be adjusted to 0.5 miles when the user is determined to be walking in a metropolitan area based on an identified tendency of users to walk greater distances in metropolitan areas than in rural areas.

In some implementations, location recognition engine 115 may determine a route that a user is travelling and activity suggestion engine 120 may provide the user with activity suggestions that are within a threshold diversion distance of the determined route. A route may be determined based on, for example, the presence of the user at multiple locations that are on a route that the user has previously traveled and/or user locations that are on a route that is commonly traveled by other users. For example, a user may be determined to be traveling from L6 to L3 via a path from 410 to 415 utilizing paths 405 and 400, based on identifying that the user commonly travels between those points and that the user has been identified at L6 and then L5. Activity suggestion engine 120 may provide the user with a user activity that may be performed at L2 if the distance from L2, which is not on the route of the user, to L1 and/or L3, is within a threshold diversion distance from the determined path.

As another example, location recognition engine 115 may determine that the user is travelling by public transportation, such as by bus. Activity suggestion engine 120 may identify the location of one or more bus stops that are on the bus route that the user is travelling and provide user activity suggestions to the user that are within a threshold walking distance from a bus stop and not provide user activity suggestions that may be within a threshold walking distance from the route, but at a location on the bus route where the user may not be able to exit the bus.

In some implementations, the activity suggestion engine 120 may determine whether a user activity may be performed by the user while the user is travelling by the determined mode of transportation. For example, activity suggestion engine 120 may determine that a user has interest in purchasing a microwave. Activity suggestion engine 120 may provide the user with the user activity suggestion of purchasing a microwave when the user is determined to be driving within a threshold distance of an appliance store. Alternatively, the user may not be provided with the user activity suggestion of purchasing a microwave if the user is determined to be walking within a threshold distance from an appliance store based on the likely lack of desire of a user that is walking to transport a microwave. Also, for example, a user may not be provided with the user activity suggestion of eating at a fine dining restaurant when the user is determined to be jogging.

In some implementations, an activity suggestion may be provided to the user after the user has performed a determined user activity. The location recognition engine 115 may store information about determined user activities of the user in content database 130, and a user activity suggestion that is based on the determined user activity may be provided to the user at a later time. For example, the user may be determined to be hiking based on identifying that the user was walking in an area that is common for hiking. Activity suggestion engine 120 may provide the user with a user activity suggestion of shopping for hiking gear at a later time when the user is within a threshold distance from a store that sells hiking gear based on the previously determined user activity of hiking and a likelihood that a user that has hiked in the past may have interest in purchasing items related to the activity of hiking. In some implementations, activity suggestion engine 120 may provide the user with a user activity suggestion in response to the user performing an action, such as accessing a cellular phone and/or accessing an application.

FIG. 6 illustrates an example suggestion that may be provided to a user based on a previous determination that the user has been hiking and that the user is within a threshold distance from a sporting goods store. The suggestion may include the name and location of the store, the distance of the store from the user's current location, review information, and/or a ranking of the store. Additionally or alternatively, the user may be provided with a map from the location of the user to the store and/or additional information. The suggestion of FIG. 6 may be provided to the user on computing device 105 when the threshold distance from the store to the user (i.e., 0.5 miles in the illustrated example) is within a threshold distance based on the mode of transportation that has been determined for the user, as described herein.

In some implementations, the information that is provided to a user may be search results that are responsive to a query from the user and the search results may be determined and/or ranked based on a determined activity of the user. For example, query engine 125 may receive a query from a user and execute the query against a search engine content database of available documents, such as webpages, images, text documents, and/or multimedia. The query engine 125 may identify content which matches the submitted query and respond by generating search results that are transmitted to one or more devices in a form that is useful for the devices. For example, in response to a query from the computing device 105, the query engine 125 may transmit a plurality of search results to be displayed in the web browser 110 that is executing on the computing device 105 based on available documents from content database 130. Content database 130 may include one or more storage mediums. For example, in some implementations, content database 130 may include multiple computer servers each containing one or more storage mediums.

In some implementations, query engine 125 may rank one or more search results and provide the search results to a user based on the ranking of the search results. In some implementations, one or more of the search results may be associated with a document. The query engine 125 may calculate scores for the search results that are responsive to the query, for example, using one or more ranking signals. Each signal may provide information about the associated document, the relationship between the associated document and the query, and/or other information that is associated with a search result. One example is a measure of the number of times the terms of the query occur in a document that is associated with a search result.

Signals may also include information about the terms of the query such as, for example, the locations where a query term appears in the title, body, and text of anchors in a document, where a query term appears in anchors pointing to the search result, how a term is used in the document (e.g., in the title of the document, in the body of the document, or in a link in the document), the term frequency (i.e., the number of times the term appears in a corpus of documents in the same language as the query divided by the total number of terms in the corpus), and/or the document frequency (i.e., the number of documents in a corpus of documents that contain the query term divided by the total number of documents in the corpus).

Ranking of one or more search results may be based on one or more determined activities of the user. For example, location recognition engine 115 may determine that a user is hiking in a particular location, and query engine 125 may boost the ranking of search results related to hiking. For example, search results for search result documents that include terms related to hiking such as "boots," "trails," the location where the user was identified as hiking, and/or other terms that may be associated with the activity of hiking may be boosted. In some implementations, terms that are associated with an activity may be identified by query engine 125 based on relationships in an entity database and/or other database. For example, an entity associated with the activity of hiking may be identified in an entity database, and aliases of that entity and/or aliases of other entities that are associated with the entity of "hiking" may be utilized to rank search results. For example, aliases such as "hiking trails", "hiking boots", and/or "backpacking" may be identified as aliases of the entity associated with the activity of hiking and/or aliases of one or more entities that are associated with the entity of "hiking." Also, for example, an entity associated with the location where the user is performing the activity may be identified in the entity database and aliases of that entity and/or aliases of other entities associated with that entity may be utilized to rank search results.

Also, for example, search results for search result documents that are associated with an entity associated with the activity of hiking may be boosted. An association between a search result document and an entity may be identified from one or more databases such as content database 130. In some implementations the database may include an index of documents and associated entities. For example, for each of a plurality of documents, a mapping (e.g., data defining an association) between the document and one or more entities related to the document may be identified in the database. For example, for a given search result document one or more entities may be mapped to the given search result document that are related to the given search result document. Each of the one or more entities may optionally be associated with a ranking that is indicative of the importance of the entity in the document. A document is any data that is associated with a document address. Documents may include HTML pages, word processing documents, portable document format (PDF) documents, images, video, and feed sources, to name just a few. The documents may include content such as, for example: words, phrases, pictures, etc.; embedded information (such as meta information and/or hyperlinks); and/or embedded instructions (such as JavaScript scripts).

As an example, an activity of hiking may be determined for a user. The user may issue a search query of "boot sellers" that returns search results that are associated with a first webpage for a country boot retailer, a second webpage for an article about purchasing boots, and a third webpage for a retailer of hiking boots. The third webpage may be the only webpage associated with the entity associated with the activity of hiking and/or may be more strongly associated with the entity associated with the activity of hiking than the first and second webpages. Accordingly, the ranking of the third webpage may be boosted based on such an association to the entity associated with the determined activity of hiking, while the first and second webpages are not boosted, or boosted to a lesser extent. Also, for example, a determined user activity may be hiking and the user may issue a search query that includes the terms "hiking maps", and a ranking of a search result for a search result document that is associated with an entity associated with one or more locations where the user has been determined to be hiking may be boosted. Also, for example, a determined user activity may be riding a bus, and the user may issue a search query of "routes", and a ranking of a search result for a search result document that is associated with an entity associated with a bus and/or an entity associated with a bus route may be boosted.

In some implementations, determination of whether an issued query relates to a determined user activity may be based an index of queries and associated entities. For example, for each query, a mapping (e.g., data defining an association) between the query and one or more entities related to the query may be identified in a database such as content database 130. An entity may be related to a query if the entity is present in search result documents responsive to the query. For example, the search query "hiking maps" may be associated with the entity associated with the activity of hiking in a query to entity mapping. Based on such an association, it may be determined that the search query relates to a determined activity of hiking and that rankings of search result documents related to hiking should be boosted.

In some implementations, a search query that is entered by a user may be modified based on the determined activity of the user. For example, query engine 125 may identify one or more terms that are related to the user activity and the query engine 125 may include the identified terms in a new search query. For example, a determined activity for a user may be riding a bus, the user may enter the query "routes", and query engine 125 may add the term "bus" to the entered search query and provide the user with search results for the query "bus routes". Query engine 125 may identify one or more terms that are related to a user activity from one or more databases, such as an entity database as described herein. For example, it may be determined that a determined user activity of riding a bus is associated with an entity associated with the vehicle bus and for the query "routes" it may be determined that the query is also mapped to an entity associated with the vehicle bus. An alias for the entity such as "bus" may be identified and added to the query to form a modified query such as "bus routes" or "routes bus".

As discussed herein, in some implementations, location recognition engine 115 may determine multiple activities that a user is currently engaged in and/or has engaged in in the past. In such implementations query engine 125 may rank one or more search results based on the multiple activities. For example, location recognition engine 115 may determine that a user is shopping and walking, and query engine 125 may boost the ranking of search results that are associated with shopping and/or search results that are associated with walking. For example, rankings of search results that are associated with both shopping and walking may be boosted a first degree and rankings of search results that are associated with just one of shopping and walking boosted a second degree that is less than the first degree. Also, as discussed herein, in some implementations, location recognition engine 115 may determine a confidence level for multiple user activities that are determined for a user, and query engine 125 may rank search results based on the confidence levels of one or more of the multiple user activities. For example, query engine 125 may boost search results that are associated with a first activity, more than search results that are associated with the second activity, if the confidence level that the user is engaging in the first activity is more indicative of confidence than the confidence level that the user is engaging in the second activity.

In some implementations, the information that is provided to a user may be one or more query suggestions that are responsive to a partial query that is entered by the user. The query suggestions may be formulated and/or ranked based on the determined user activity. One or more applications executing on the computing device 105 may provide one or more components with partial queries as the queries are being formulated by users. In some implementations, the application may provide the query engine 125 and/or a component associated with the query engine 125 with a query before the user has indicated completion of the query. The applications may be, for example, a web browser 110, a toolbar running in the web browser 110, an email application, a text messaging application, and/or a search client running on the computing device 105. In some implementations, an application may provide each character of the query as it is typed or otherwise entered by the user (e.g., spoken input provided by the user). In some implementations, an application may provide multiple characters at a time, optionally following a pause by the user between character entries.

A partial query is a query formulated by a user prior to an indication by the user that the query is a completed query. In some implementations, a user may indicate a completed query by entering a carriage return and/or other character. In some implementations, a user may indicate a completed query by selecting a search button or other submission button in a user interface presented to the user. In some implementations, a user may indicate a completed query by speaking a command in a speech user interface. In some implementations, a user may indicate a completed query by pausing more than a predetermined amount of time during entering of the query. Other forms of providing a partial query and/or indicating a completed query may additionally and/or alternatively be utilized.

In response to a partial query entered by a user, the computing device 105 may facilitate entry of user input by providing suggested inputs to the user. For example, when the user enters one or more characters, the computing device 105 can provide query suggestions that are selected using the one or more characters. In some implementations, the query suggestions may be provided to the computing device 105 by query engine 125. The query suggestions that are provided may include words or phrases that include the one or more characters that were entered by the user. For example, complete words or extended phrases can be suggested for partial words or partial phrases that a user has entered (e.g., using a physical or virtual keyboard). The query suggestions can also include words or phrases that are similar to (e.g., synonyms or spelling corrections of) the user input. The user can select one of the provided query suggestions to enter the text of the selected query suggestion. Selecting may include, for example, a mouse-click, a click-through, a voice-based selection, a selection by a user's finger on a presence-sensitive input mechanism (e.g., a touch-screen device), and/or any other appropriate selection mechanism.

In some implementations, one or more terms that are associated with a determined user activity may be utilized in forming one or more query suggestions that are provided to the user. Terms that are associated with a user activity may be identified by one or more databases, such as content database 130. For example, location recognition engine 115 may determine that a user is riding a bus on a particular bus route based on one or more locations of the user that is on the bus route. Location recognition engine 115 may provide the query engine 125 with information related to the determined activity of riding a bus on the particular bus route and query engine 125 may utilize the information about the user activity to formulate one or more query suggestions for the user. For example, the location recognition engine 115 may determine that the user is riding a bus on bus route "#8—Halsted Street" based on identified user locations on the bus route. The user may input the partial query "route" and query suggestions formulated based on the partial query and the determined user activity, such as "route halsted", "route #8", "bus route #8—halsted street", "routes chicago transit authority", "bus routes Chicago", etc.

In some implementations, query engine 125 may identify a query suggestion from a database that includes one or more query suggestions that have been previously determined and/or ranked. Such query suggestions may be provided to a user. In some implementations, the query suggestions may include those determined based on a list of previously submitted queries of one or more users, a list of automatically generated queries, and/or real time automatically generated queries. For example, the query engine 125 may use prefix based matching to identify query suggestions from a list of past user queries and/or from matches to entries in the query suggestion database.

In some implementations the query engine 125 may rank one or more of the query suggestions (e.g., determine scores for one or more of the provided query suggestions; determine which query suggestions to provide to a user) based on a determined user activity. For example, an existing ranking of the query suggestions may be modified based on a determined user activity. In some implementations, query engine 125 may rank search query suggestions based on the similarity between query suggestions that have been identified by the query engine 125 and one or more entities and/or terms that are associated with the determined user activity. For example, a determined user activity may be associated with one or more terms and a ranking of any query suggestions that include such one or more terms may be increased.

Also, for example, a determined user activity may be associated with one or more entities and a ranking of any query suggestions that are associated with such one or more entities may be increased. A mapping between query suggestions and entities may optionally be utilized. For example, for each query suggestion, a mapping (e.g., data defining an association) between the query suggestion and one or more entities related to the query suggestion may be identified in a database such as content database 130. An entity may be related to a query suggestion if present in search result documents responsive to a query issued for the query suggestion. For example, a determined user activity may be hiking and a partial query of "hi" entered by the user. The query suggestion "hiking maps" may be a candidate query suggestion for the partial query and associated with the entity associated with the activity of hiking in a query suggestion to entity mapping. Based on the query suggestion "hiking maps" being associated with the entity associated with the determined activity of hiking, the ranking of the query suggestion "hiking maps" may be increased. In some implementations, the ranking of the query suggestions may be utilized to determine which query suggestions are provided to a user and/or in which order the query suggestions are displayed to the user.

Query suggestions may be displayed to a user in a user interface of the computing device 105. For example, the query suggestions may be displayed within a cascaded drop down menu of the search field of an application, such as a web browser executing on the computing device 105, as the user is typing the query. Also, for example, the query suggestions may be displayed in a plurality of separately selectable cells arranged in one or more rows or columns in a user interface as the user is typing the query. For example, query suggestions that were identified based on a user activity may be displayed in a column separate from other query suggestions. In some implementations, one or more search results for a query suggestion may also optionally be displayed as the user is typing the query.

In situations in which the systems discussed herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

Many other configurations are possible having more or less components than the environment shown in FIG. 1. For example, although the components are each illustrated alone in FIG. 1, it is understood that one or more of the query engine 125, the location recognition 115, the activity suggestion engine 120, the content database 130, and/or the computing device 105 may be combined in some implementations.

Figure 2:
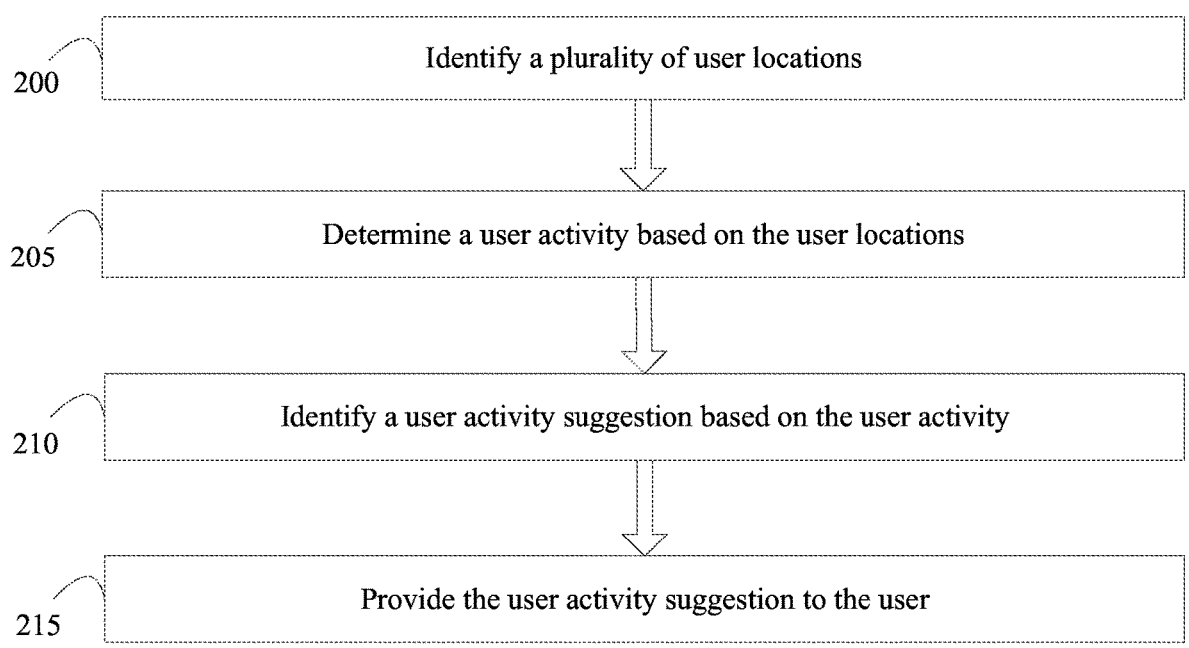
FIG. 2 is a flow chart illustrating an example method of providing activity suggestions to a user based on a determined user activity.

Referring to FIG. 2, a flow chart is provided illustrating an example method of providing an activity suggestion to a user based on a determined user activity. Other implementations may perform the steps in a different order, omit certain steps, and/or perform different and/or additional steps than those illustrated in FIG. 2. The steps of the method illustrated in FIG. 2 may be performed by one or more components illustrated in FIG. 1.

At step 200, a plurality of user locations are identified. The user locations may be identified by a component that shares one or more characteristics with location recognition engine 115. The user locations may be identified via one or more computing devices of the user that shares one or more hardware and/or software components with computing device 105. For example, the computing device 105 may provide the user locations directly (e.g., based on input from a GPS sensor of the computing device and/or an RF sensor of the computing device), user interactions with the computing device 105 may provide an indication of the user locations (e.g., a user checking-in to a location via the computing device), and/or one or more computing devices interacting with the computing device 105 may provide the user locations (e.g., a computing device interacting with a cellular tower providing a signal to the computing device, a computing device interacting with an RF signal provided to the computing device).

In some implementations, location recognition engine 115 may identify a location of a user on a periodic basis. In some implementations, user locations may be identified asynchronously, such as when the user is detected as changing a location by more than a threshold distance. In some implementations, a user location may be identified based on the presence of the user at a location for a threshold amount of time. In some implementations, location recognition engine 115 may identify additional information about a location. For example, in some implementations, location recognition engine 115 may identify an entity that is located at a user location and/or one or more characteristics of the location. In some implementations, location recognition engine 115 may identify a time period (e.g., a duration and/or specific time(s) of the day) when a user is present at a location.

At step 205, a user activity is determined for the user based on the user locations that were identified at step 200. The user activity may be determined by the location recognition engine 115. The user activity may be based on the user locations, time spent at one or more user locations, the distance between user locations, and/or the time in traveling between two or more user locations.

In some implementations, a user activity may be determined based on the type of location where the user has been identified. For example, a user location may be identified as a bus stop and a user activity of riding a bus may be determined based on the presence of the user at the bus stop. Also, for example, the location types for multiple user locations may be utilized to determine the user activity. For example, a user may identified at multiple user locations that are retail stores and location recognition engine 115 may determine that the user is shopping based on the identified user locations that are related to shopping.

In some implementations, a user activity may be determined based on the time spent at a location. For example, a user activity of dining may be determined based on a user spending a threshold amount of time at a user location that has been identified as a restaurant. Also, for example, location recognition engine 115 may determine a user activity of riding a bus based on a user spending a short amount of time at multiple bus stops.

In some implementations, location recognition engine 115 may determine that a user activity includes a mode of transportation. For example, location recognition engine 115 may determine that a user is walking, riding a bus, hiking, and/or driving a car based on one or more of the user locations. For example, based on times that a user is present at multiple locations and the distance between the locations, location recognition engine 115 may determine the speed at which the user is travelling between the locations. The determined speed may be indicative of the mode of transportation. For example, a user that is determined to be traveling 60 mph is more likely to be traveling by car or bus than walking or hiking. Also, location recognition engine 115 may identify the mode of transportation for a user based on the types of locations that are identified as user locations. For example, multiple user locations that are bus stops may be indicative of a user riding a bus.

In some implementations, location recognition engine 115 may determine one user activity for a user based on identified user locations. In some implementations, location recognition engine 115 may determine multiple user activities based on the same user locations. In some implementations, location recognition engine 115 may determine confidence levels for multiple user activities based on the same set of user locations, and the confidence levels may be indicative of the likelihood that the user is performing the associated user activity. In some implementations, location recognition engine 115 may determine that the user is engaged in multiple user activities simultaneously.

At step 210, a user activity suggestion is identified based on the user activity that was identified at step 205. In some implementations, the user activity suggestion may be identified by a component that shares one or more characteristics with location recognition engine 115. The user activity suggestion may be provided to the user via one or more applications that are executing on computing device 105, such as browser 110.

In some implementations, the user activity suggestion may be an activity that may be performed by the user while the user is performing the determined user activity. For example, location recognition engine 115 may identify that the user is shopping and identify a user activity suggestion of the user shopping at a store that is nearby. Also, for example, location recognition engine 115 may determine that the user is walking and may identify a user activity suggestion of dining at a restaurant that is within a threshold walking distance from the user.

In some implementations, location recognition engine 115 may identify a user activity suggestion based on the amount of time the user spent at a location that is associated with the determined user activity. For example, location recognition engine 115 may identify a user activity suggestion of dining at a second restaurant only when a user is determined to be at another restaurant and the time spent at the other restaurant is below a threshold amount of time that is indicative of a user eating a complete meal. Also, for example, location recognition engine 115 may identify a different user activity suggestion if the user is determined to be dining at a restaurant for an entire meal, such as a user activity suggestion of going to a movie.

FIG. 7 illustrates another example suggestion that may be provided to a user based on a determination that the user is having dinner and that the user is within a threshold distance from a movie theater where one or more movies may be playing. The illustrated suggestion includes the name and location of the movie theater, the distance of the theater from the user's current location, and a listing of movies and showtimes. Additionally or alternatively, additional information about the movie theater and/or the determined user activity may be provided, such as a map from the location of the user to the theater, an option to purchase tickets to a movie, and/or an indication that a movie may be a good post-dinner activity. The suggestion of FIG. 7 may be provided to the user on computing device 105 when the user has been identified at a restaurant for a period of time that is indicative of the user nearing completion of an entire meal. Additionally or alternatively, the user may be provided the suggestion when a movie theater is within a threshold distance from the user based on the mode of transportation that has been determined for the user, as described herein (i.e., 0.3 miles in the illustrated example). In some implementations, the user may not be provided with the suggestion of seeing a movie if the user is not identified at the restaurant location for a time that is indicative of having an entire meal and/or if the distance and/or route to the movie theater is not conducive to the mode of transportation of the user.

In some implementations, location recognition engine 115 may identify user activity suggestions based on a distance between one or more user locations and a location that is associated with the user activity suggestion. For example, location recognition engine 115 may determine that a user is shopping and may identify a user activity suggestion of shopping at a different store that is within a threshold distance of the store where the user is currently shopping. In some implementations, only suggested user activities that are within a threshold distance of the user may be identified, wherein the threshold distance is based on the determined user activity. For example, user activities that may be suggested to the user when location recognition engine 115 has determined that the user is walking may be within a first threshold distance that is shorter than a second threshold distance if the location recognition engine 115 has determined that the user is driving. In some implementations, the location recognition engine 115 may identify user activity suggestions that are within a threshold detour distance from one or more user locations.

At step 215, the user activity suggestion is provided to the user. The user activity suggestion may be provided to the user by a component that shares one or more characteristics with activity suggestion engine 120. In some implementations, the user activity suggestion may be provided to the user via one or more applications executing on a computing device that shares one or more characteristics with computing device 105, such as browser 110.

In some implementations, the user activity suggestion may be provided to the user while the user is performing the determined user activity. In some implementations, the user activities may be provided to the user after the user has performed the determined user activity, such as when the user is proximal to a location where a user activity suggestion may be performed. For example, location recognition engine 115 may determine that the user is hiking and activity suggestion engine 120 may provide the user with a user activity suggestion of shopping for hiking boots when the user is proximal to a location where hiking boots are sold.

Figure 3:
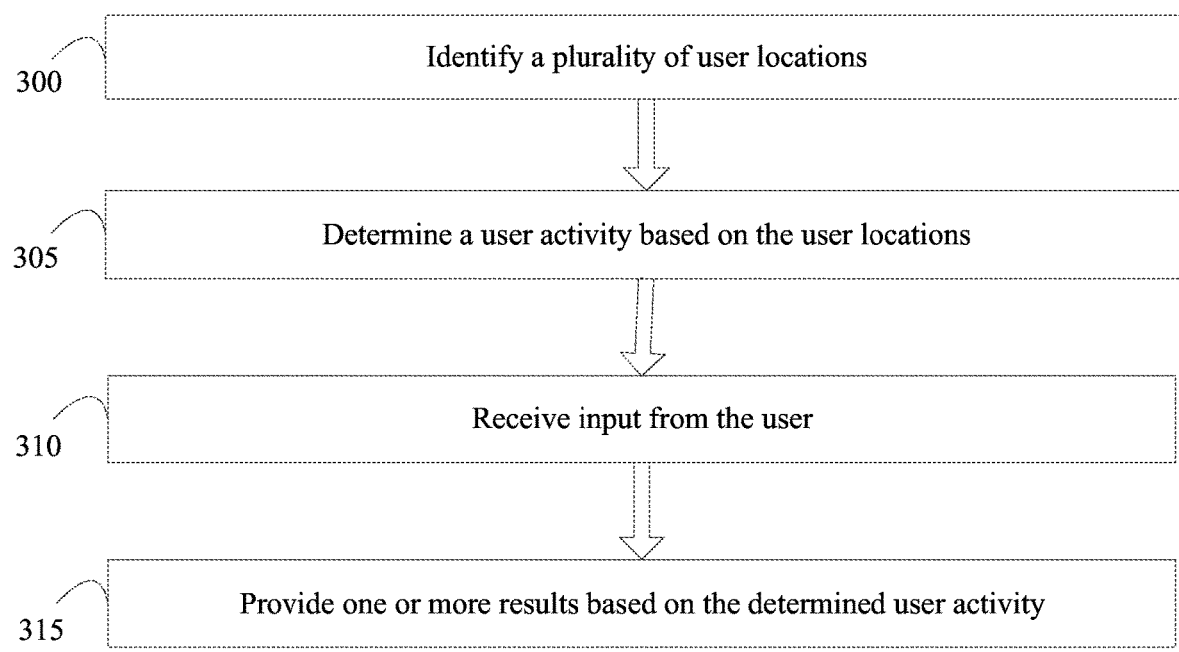
FIG. 3 is a flow chart illustrating an example method of providing results to a user based on a determined user activity.

Referring to FIG. 3, a flow chart is provided illustrating an example method of providing results to a user based on a determined user activity. Other implementations may perform the steps in a different order, omit certain steps, and/or perform different and/or additional steps than those illustrated in FIG. 3. The steps of the method illustrated in FIG. 3 may be performed by one or more components illustrated in FIG. 1.

At step 300, a plurality of user locations are identified. The user locations may be identified utilizing one or more methods and/or apparatus as described herein. Step 300 may share one or more aspects in common with step 200 of FIG. 2.

At step 305, a user activity is determined for the user based on the user locations that were identified at step 300. A user activity may be determined using one or more methods as described herein. Step 305 may share one or more aspects in common with step 205 of FIG. 2.

At step 310, input is received from the user. The input may be entered by the user via one or more applications that are executing on computing device 105, such as browser 110. The input may be received by a component that shares one or more aspects with query engine 125. In some implementations, the received input may be a search query and the determined user activity may be utilized to rank search results that are responsive to the received search query as described herein. In some implementations, the received search query may be modified based on the determined user activity, and the modified search query may be utilized to perform a search as described herein. In some implementations, the received input may be a partial query and the determined user activity may be utilized to form and/or rank one or more query suggestions as described herein.

At step 315, one or more results are provided to the user based on the determined user activity. The results may be provided to the user via one or more applications on computing device 105, such as browser 110, and may be provided by a component that shares one or more aspects with query engine 125. In implementations where the received input is a search query, the query engine 125 may provide the user with one or more search results that are responsive to the entered search query. In implementations where the received input is a partial query, the query engine 125 may provide the user with one or more query suggestions that are responsive to the user input.

Figure 5:
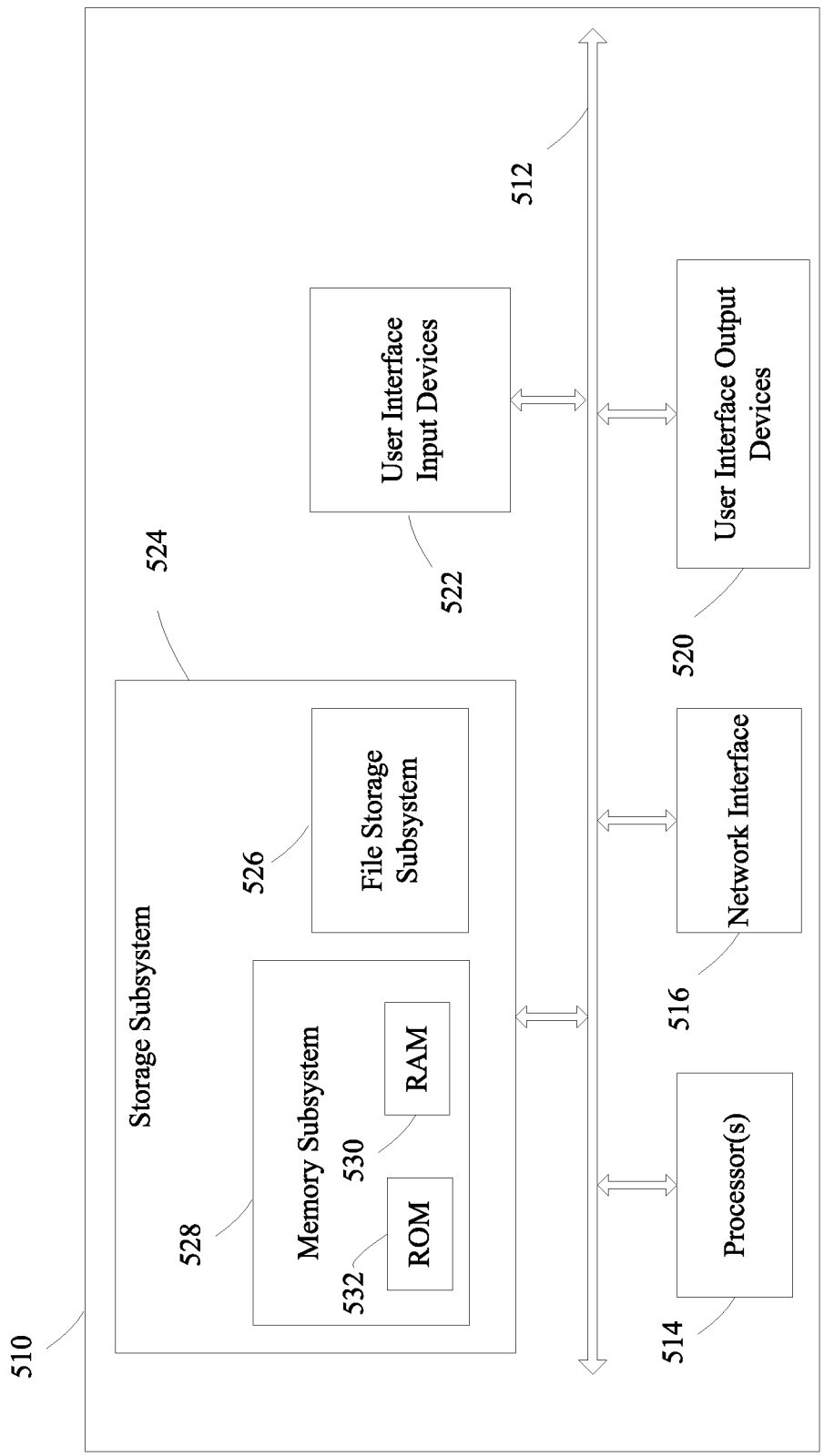
FIG. 5 illustrates a block diagram of an example computer system.

FIG. 5 is a block diagram of an example computer system 510. Computer system 510 typically includes at least one processor 514 which communicates with a number of peripheral devices via bus subsystem 512. These peripheral devices may include a storage subsystem 524, including, for example, a memory subsystem 526 and a file storage subsystem 528, user interface input devices 522, user interface output devices 520, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein. For example, the storage subsystem 524 may include the logic to determine a user activity and provide information to the user based on the determined user activity according to one or more processes described herein.

These software modules are generally executed by processor 514 alone or in combination with other processors. Memory 526 used in the storage subsystem can include a number of memories including a main random access memory (RAM) 530 for storage of instructions and data during program execution and a read only memory (ROM) 532 in which fixed instructions are stored. A file storage subsystem 528 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 528 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

While several inventive implementations have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive implementations described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive implementations described herein. It is, therefore, to be understood that the foregoing implementations are presented by way of example only and that, within the scope of the appended claims and equivalents thereto, inventive implementations may be practiced otherwise than as specifically described and claimed. Inventive implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over vocabulary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one implementation, to A only (optionally including elements other than B); in another implementation, to B only (optionally including elements other than A); in yet another implementation, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one implementation, to at least one, optionally including more than one, A, with no B present (and optionally including elements other than B); in another implementation, to at least one, optionally including more than one, B, with no A present (and optionally including elements other than A); in yet another implementation, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

The invention claimed is:

1. A method implemented by one or more processors, comprising:
   determining an activity that a user is currently engaged in based on a plurality of sensor readings from one or more sensors of a computing device of the user, wherein the user activity is a given mode of transportation, and wherein the sensor readings from one or more of the sensors are taken over a period of time to determine the given mode of transportation;
   receiving a partial search query entered by the user via a user interface input device of the computing device of the user, the partial search query entered in a search field of an application executing on the computing device, and the partial search query including one or more characters entered by the user prior to indicating, via user interface input, that the partial search query is a completed query; and
   in response to receiving the partial search query and while the user is currently engaged in the determined activity:
      identifying a plurality of query suggestions based on the partial search query, the query suggestions including at least one query suggestion that includes the characters of the partial search query and additional characters that are not included in the partial search query;
      ranking the query suggestions, for the partial search query, based on the determined activity, wherein ranking a given query suggestion comprises:
         determining whether one or more terms associated with the determined activity in at least one database are present in the given query suggestion, and
         when it is determined that one or more of the terms associated with the determined activity are present in the given query suggestion:
            boosting the ranking of the given query suggestion based on associations between the one or more terms present in the given query suggestion and the determined activity,
            wherein at least one given query suggestion of the query suggestions includes one or more of the terms associated with the determined activity in the at least one database;
      selecting, based on the ranking that is based on the activity, a group of the query suggestions to provide in response to the partial search query; and
      providing, in response to the partial search query, the selected group of the query suggestions for presentation to the user via a user interface output device of the computing device of the user, wherein providing the selected group of the query suggestions comprises providing the selected group of query suggestions for display in the application and for selection by the user via further user interface input.

2. The method of claim 1, wherein determining that the one or more terms associated with the determined activity in at least one database are present in the given query suggestion is based on:
   identifying that the one or more terms are assigned in a database to an entity associated with the activity.

3. The method of claim 1, wherein the one or more sensors include an accelerometer.

4. The method of claim 3, further comprising:
   receiving a first portion of the sensor readings, of the accelerometer, at a first time, of the period of time; and
   receiving a second portion of the sensor readings, of the accelerometer, at a second time, of the period of time,
      wherein the sensor readings of the accelerometer indicate forces of movements and frequencies of the movements, and
      wherein determining the activity that the user is currently engaged in based on the sensor readings comprises determining, based on the first portion of the sensor readings and the second portion of the sensor readings, the user activity is the given mode of transportation.

5. A system comprising:
   at least one non-transitory computer readable storage medium storing instructions;
   one or more hardware processors operable to execute the instructions to:
      determine, based on a plurality of sensor readings from one or more sensors of a computing device of a user, a user activity that the user is currently engaged in, wherein the user activity is a given mode of transportation, and wherein the sensor readings from one or more of the sensors are taken over a period of time to determine the given mode of transportation;
      receive a partial search query entered by the user via a user interface input device of the computing device, the partial search query entered in a search field of an application executing on the computing device, and the partial search query including one or more characters entered by the user prior to indicating, via user interface input, that the partial search query is a completed query; and
      in response to receiving the partial search query and while the user is currently engaged in the determined activity:
         identify a plurality of query suggestions based on the partial search query, the query suggestions including at least one query suggestion that includes the characters of the partial search query and additional characters that are not included in the partial search query;
         rank the query suggestions, for the partial search query, based on the determined activity, wherein ranking a given query suggestion comprises:
            determining whether one or more terms associated with the determined activity in at least one database are present in the given query suggestion, and
            when it is determined that one or more of the terms associated with the determined activity are present in the given query suggestion:
               boosting the ranking of the given query suggestion based on associations between the one or more terms present in the given query suggestion and the determined activity,
               wherein at least one given query suggestion of the query suggestions includes one or more of the terms associated with the determined activity in the at least one database;
         select, based on the ranking that is based on the activity, a group of the query suggestions to provide in response to the partial search query; and
         provide, in response to the partial search query, the selected group of the query suggestions for presentation to the user via a user interface output device of the computing device of the user, for display in the application and for selection by the user via further user interface input.

6. The system of claim 5, wherein in determining that the one or more terms associated with the determined activity in at least one database are present in the given query suggestion the one or more of the processors are to:
identify that the one or more terms are assigned in a database to an entity associated with the activity.

7. The system of claim 1, wherein the one or more sensors include an accelerometer.

8. The system of claim 7, further comprising:
receiving a first portion of the sensor readings, of the accelerometer, at a first time, of the period of time; and
receiving a second portion of the sensor readings, of the accelerometer, at a second time, of the period of time,
wherein the sensor readings of the accelerometer indicate forces of movements and frequencies of the movements, and
wherein determining the activity that the user is currently engaged in based on the sensor readings comprises determining, based on the first portion of the sensor readings and the second portion of the sensor readings, the user activity is the given mode of transportation.

9. A method implemented by one or more processors, comprising:
determining an activity that a user is currently engaged in based on a plurality of sensor readings from one or more sensors of a computing device of the user, wherein the user activity is a given mode of transportation, and wherein the sensor readings from one or more of the sensors are taken over a period of time to determine the given mode of transportation;
receiving a search query submitted by the user via a user interface input device of a computing device of the user via an application executing on the computing device, wherein the user has indicated, via user interface input, that the search query is a completed search query, as opposed to a partial search query;
modifying the search query based on the activity, wherein modifying the search query is by one or more of the processors and comprises:
identifying one or more terms that are related to the activity, and
adding the one or more terms to the search query to create a modified search query;
submitting the modified search query to a search system in lieu of the search query submitted by the user;
identifying a plurality of search results that are responsive to the modified search query; and
providing, in response to the search query and utilizing one or more of the processors, one or more of the search results, that are responsive to the modified query, for presentation to the user via a user interface output of the computing device of the user, wherein the providing is while the user is currently engaged in the determined activity.

10. The method of claim 9, wherein identifying the one or more terms that are related to the activity comprises:
determining an entity that is mapped to both the activity and to the search query; and
identifying the one or more terms based on the one or more terms being an alias of the entity.

11. The method of claim 9, wherein the one or more sensors include an accelerometer, wherein the sensor readings of the accelerometer indicate forces of movements and frequencies of the movements, and further comprising:
receiving a first portion of the sensor readings, of the accelerometer, at a first time, of the period of time; and
receiving a second portion of the sensor readings, of the accelerometer, at a second time, of the period of time,
wherein determining the activity that the user is currently engaged in based on the sensor readings comprises determining, based on the first portion of the sensor readings and the second portion of the sensor readings, the user activity is the given mode of transportation.

12. The method of claim 1, wherein the one or more sensors include a GPS sensor.

13. The method of claim 12, further comprising:
receiving a first portion of the sensor readings, of the GPS sensor, at a first time, of the period of time; and
receiving a second portion of the sensor readings, of the GPS sensor, at a second time, of the period of time,
wherein the sensor readings of the GPS sensor indicate a location of the computing device of the user, and
wherein determining the activity that the user is currently engaged in based on the sensor readings comprises determining, based on the first portion of the sensor readings and the second portion of the sensor readings, the user activity is the given mode of transportation.

14. The method of claim 1, wherein the given mode of transportation includes: bicycling, walking, hiking, jogging, running, car travel, air travel, bus travel, or train travel.

* * * * *